United States Patent
White et al.

[11] 3,996,142
[45] Dec. 7, 1976

[54] SMOKE AND FIRE RETARDANTS FOR HALOGEN-CONTAINING PLASTIC COMPOSITIONS COMPRISING THE REACTION PRODUCT OF MAGNESIUM OXIDE AND A ZINC SALT OF AN ACID

[75] Inventors: Edward L. White, Freehold; William E. Robertson, Trenton; Joseph Schwarcz, Highland Park, all of N.J.

[73] Assignee: NL Industries, Inc., New York, N.Y.

[22] Filed: Dec. 11, 1974

[21] Appl. No.: 531,687

[52] U.S. Cl. .............................. 252/8.1; 106/15 FP; 260/45.75 W; 260/2.5 FP; 423/279; 423/306; 423/331; 423/518; 423/593; 428/921
[51] Int. Cl.² ............................................ C09K 3/28
[58] Field of Search ................... 252/8.1, 188.3; 260/45.75 W; 106/15 FP; 428/921; 423/593, 279, 306, 518, 331

[56] References Cited
UNITED STATES PATENTS

| | | | |
|---|---|---|---|
| 2,610,920 | 11/1948 | Hopkinson | 252/8.1 |
| 3,453,225 | 7/1969 | Pollock | 260/45.75 W |
| 3,546,262 | 12/1970 | Rinse | 260/45.75 W |
| 3,639,319 | 2/1972 | Bergman | 260/45.75 W |

OTHER PUBLICATIONS

Bhatnagar: "Advances in Fire Retardants, Part 2" Technomic Publishing Co. (1973) p. 140.

*Primary Examiner*—Benjamin R. Padgett
*Assistant Examiner*—David Leland

[57] ABSTRACT

Magnesium oxide and a zinc salt are reacted with one another to form a magnesium zinc complex salt which is added to a halogen-containing plastic composition to serve as a smoke and/or fire retardant during combustion of the plastic. This magnesium-zinc complex salt is normally added along with an antimony compound but may be used alone if desired.

15 Claims, No Drawings

SMOKE AND FIRE RETARDANTS FOR HALOGEN-CONTAINING PLASTIC COMPOSITIONS COMPRISING THE REACTION PRODUCT OF MAGNESIUM OXIDE AND A ZINC SALT OF AN ACID

BACKGROUND OF INVENTION

Plastic materials including plastic sheeting, synthetic fibers and the like are generally considered to be hazardous materials from the standpoint of flammability; and in many cases it is the practice to add various flame retardants to the plastic materials to reduce flammability during combustion. Recently, however, the propensity of plastics to create large volumes of smoke, when combusted, has come to be regarded as at least as hazardous, if not more so, than its flammability. Increasing concern with consumer safety and several tragic accidents have contributed to the recognition of smoke evolution as a significant hazard. In many instances of fire, the resulting fatalities have been due to smoke which has prevented safe evacuation of a building due to lack of visibility; or to the toxic gases generated during combustion of the plastic.

As mentioned above, extensive studies have been made in the area of flame-retardant additives for halogen-containing plastic compositions, examples of which are antimony trioxide, antimony pentaoxide, antimony-silica oxide and other organic and inorganic compositions of antimony. Zinc borate has been used also as a flame retardant but so far as is known never as a smoke suppressant and always at relatively high levels as for example, from 3 to 8 parts per hundred parts resin since lesser amounts are ineffective as a flame retardant. Moreover the concept of suppressing smoke as well as retarding flammability is disclosed in U.S. Pat. No. 3,723,139, Larkin et al who disclose the addition of antimony oxide in combination with sodium antimonate to polyvinyl chloride plastics both to minimize flammability and to suppress smoking.

Copending application Ser. No. 426,492, filed Dec. 20, 1973, discloses and claims halogen-containing plastic compositions which contain various zinc salts in amounts from 0.2 to 1 part calculated as zinc oxide per hundred parts of polymer resin, which are also useful as smoke suppressants.

However, when these zinc salts are used at higher concentration than that specified above, for retarding fire in addition to smoke, the zinc salts tend to degrade the plastic composition when they are originally prepared by conventional high temperature processes.

SUMMARY OF INVENTION

A new composition of matter has been produced comprising a magnesium-zinc complex salt of an acid, said composition prepared by reacting 2 to 10 moles of magnesium oxide with 1 mole of a zinc salt of an inorganic or organic acid. These complex salts are prepared by reacting an aqueous slurry or magnesium oxide with a solution or slurry of the zinc salt, the amount of magnesium oxide employed being from 2 to 10 moles for each mole of said zinc salt.

These magnesium-zinc complex salts are highly desirable to use in halogen-containing polymer compositions to impart smoke and/or flame resistance to the polymer employed. In addition, these magensium-zinc complex salts also do not adversely effect the heat stability.

DESCRIPTION OF THE PREFERRED EMBODIMENTS

These complex salts are useful for treating substantially any plastics. These plastics which are particularly applicable, include among others, are step growth polymers such as polyesters, polyamides, polyurethanes, polyanhydrides, polyacetals, phenol-formaldehyde resin, urea-formaldehyde resin, melamineformaldehyde resin, epoxy resins, polyethers, poly(ethylene terephthalate), poly(arylene ethers), poly(arylene alkylidenes), polycarbonates, poly(carbodiimides) and chain growth polymers, such as polyethylene, polypropylene, polybutadiene, polystyrene, acrylonitrile/butadiene/styrene terpolymer or polyblend, poly (vinylidene chloride), poly(vinyl chloride), polyisoprene, poly(vinyl acetate), acrylate polymers such as poly(methyl methacrylate), polymethacrylic acid and the like. With those polymers which do not contain halogen in their structure, an organic halogen containing additive must be added.

The zinc salts which are particularly desirable to employ, to produce the magnesium-zinc complex salts include among others, inorganic compounds of zinc such as zinc sulfate, zinc borate, zinc phosphate, zinc phosphite, zinc fluoborate, zinc orthophosphate, zinc sulfite, zinc fluosilicate, zinc silicate and zinc sulfamate, while zinc organic salts, such as, for example, zinc trimellitate, zinc pyromellitate, zinc terephthalate, zinc fumarate, zinc phthalate, zinc maleate, zinc salicylate, zinc gluconate, zinc tartrate, zinc isophthalate, zinc orthophthalate, zinc adipates, zinc glutamates and zinc lactate may also be employed.

It will be understood that the zinc compounds listed above which are used to form the complex salt are not restrictive but that other zinc compounds, inorganic and organic which form the magnesium-zinc complex salt may also be employed.

As stated above, the magnesium oxide and the zinc salt of the acid are mixed together in an aqueous media under agitation. The complex formed is filtered, dried and pulverized to obtain a finely divided powder. From 2 to 10 moles of magnesium oxide are used for each mole of the zinc salt.

The incorporation of the magnesium-zinc complex salts into the plastic compositions is accomplished by blending the magnesium zinc complex salt with the components used in formulating the plastic compositions.

Preparation of these polymer compositions is effected by standard methods and standard equipment in the art, the amount of magnesium-zinc complex salt added, being in the range of from 0.2 to 20 parts per hundred parts resin.

Generally, the treated plastic compositions will contain a combination of the complex magnesium-zinc salt and an antimony compound, however, the plastic composition may contain the magnesium-zinc complex salt in the absence of the antimony. It is particularly desirable to use only the magnesium-zinc complex salt without the antimony in applications when opacity or sulfide staining is to be avoided.

The plastic composition which has been treated with the magnesium-zinc complex salts is subjected to the following tests:

SMOKE TEST

The smoke suppressant capabilities of the complex salts used in test specimens of polymer compositions was tested using the National Bureau of Standards (NBS) Smoke Density Chamber, a detailed description of which is given in a paper entitled, "Method for Measuring Smoke from Burning Material," by D. Gross, J. J. Loftus and A. F. Robinson — in Symposium on Fire Test Methods Restraint of Smoke, 1966 ASTM STP422. American Society Testing Materials, 1967, p. 166.

OXYGEN INDEX

The oxygen index is measured on vertically mounted molded samples using the ASTM oxygen index test identified as ASTM D-2863.

VERTICLE BAR TEST

A vertical bar test is also run using the Underwriters Laboratories test UL-94.

OVEN HEAT STABILITY TEST

Samples of the treated plastic are placed on thin strips of aluminum foil which lie on a tray. The tray is placed in an oven at 375° F. and the strips are removed one at a time at time intervals of 10, 30, 40, 60, 70, 80, 90 and 100 minutes. The samples are then compared with a standard heat stability card and the sample is examined for the extent of discoloration at the various time intervals.

A typical complex salt of the instant invention may be prepared as follows:

A slurry of magnesium oxide is prepared which may contain from 10% to 20% solids. The magnesium oxide selected should be finely divided and be a reactive type of magnesium oxide.

Zinc salts of the types described above should be formed as aqueous slurries or as aqueous solutions. The solids content preferably should be from 25% to 50%.

In order to form the complex, the zinc solution or zinc slurry is added to the magnesium oxide slurry with agitation. The mixture is agitated for 1 to 10 hours. The temperature is maintained between 25° C. and 90° C.

After the reaction has taken place, the slurry is filtered, dried and pulverized to obtain a finely divided powder.

In order to describe more fully the instant invention, the following examples are presented:

EXAMPLE 1

Preparation of a basic Magnesium-Zinc Sulfate Complex

In this example a normal zinc sulfate solution was reacted with a slurry of magnesium oxide to produce the magnesium-zinc complex salt. The mole ratio of magnesium oxide to zinc sulfate was 3.3 to 1.

The normal zinc sulfate solution was prepared as follows:

62 g. of 97.7% $H_2SO_4$ were added to 125 ml. $H_2O$ in a beaker immersed in an ice bath. The solution was cooled to 18° C. 50.4 g. of zinc oxide were added to the bath over a 5 minute period. The temperature rose from 18° to 60° C. The solution was then allowed to cool to room temperature.

A slurry of magnesium oxide was prepared by adding 94 g. of 88.4% magnesium oxide to 400 ml. $H_2O$. The zinc sulfate solution was then added dropwise to the magnesium oxide slurry with agitation over a period of 50 minutes during which time a thick slurry was formed. The slurry formed was then agitated for 5 hours. The pH was 9.7. The complex salt was then recovered by filtration, drying 18 hours at 105° C. and hammer milling through a 0.02 inch screen.

This complex salt obtained, weighed 218 g. and possessed the following analysis:

| | |
|---|---|
| % Zn | 18.4 |
| % Mg | 21.2 |
| % Loss (2 hrs. at 105° C.) | 1.2 |
| Moles Mg/Zn | 3.10 |

This magnesium-zinc complex salt was used to treat a polyvinyl chloride composition as follows:

100 parts of polyvinyl chloride were mixed thoroughly with 50 parts of dioctylphthalate, 1.5 parts of modified dibutyl tin maleate, 3 parts of antimony trioxide and 3.5 parts of basic magnesium-zinc sulfate.

After thorough mixing, the mill was set at 350° F. and the plastic mixture was added to the rolls and milled to obtain a plastic sheet 40 mils in thickness. The plastic sheet was then tested for the following properties:

Maximum Smoke Density (Dm)
Oxygen Index (O.I.)
Verticle Bar Test (UL-94)
Oven Heat Stability The operational details and results obtained are recorded in Table I.

A control run (identified as Control A) was carried out in which a mechanical mixture of magnesium oxide and zinc sulfate were used instead of the complex salt. The amounts employed were equal to the amounts used in Example 1. The results are also recorded in Table I. It is evident that the use of the complex employed in Example 1 is superior to the control which used a mixture of magnesium and zinc compounds instead of the complex of Example 1.

Another control run (identified as Control B) was carried out using a mechanical mixture of magnesium sulfate and zinc sulfate instead of using the complex salt of Example 1. The results are also recorded in Table I. This Control Run B along with Control Run A produced inferior results to those obtained when the complex salt was employed.

EXAMPLE 2

In this example the procedure of Example 1 was repeated except that basic magnesium-zinc fluoborate was prepared by reacting magnesium oxide with zinc fluoborate.

This complex was added to polyvinyl chloride as described in Example 1 along with a control run (identified as Control C) which was a mechanical mixture of magnesium oxide and monobasic zinc fluoborate.

The results are also recorded in Table I and superiority is again shown using the complex salt over the mixture of the two compounds.

EXAMPLE 3

Repeating the procedure of Example 1, the complex basic magnesium-zinc fluosilicate was prepared. This complex was used in polyvinyl chloride along with two controls, 1. a mixture of magnesium oxide and normal zinc fluosilicate (identified as Control D).

2. control which contained no magnesium or zinc compounds was also run (identified as Control E). This control run produced higher smoke density than any of the examples in Examples 1–3.

Again the results show that the plastic containing the complex is again superior to the controls.

EXAMPLES 4–9

In these examples various magnesium-zinc complex salts were prepared according to Example 1 and these complexes were used as additives to another polyvinyl chloride composition. This plastic composition contained the following ingredients:

| Parts | Ingredients |
| --- | --- |
| 100 | Polyvinyl chloride |
| 50 | Dioctyl phthalate |
| 2 | Barium/cadmium stabilizer |
| 3 | Epoxidized oil |
| 0.5 | Stearic acid |
| 3 | Antimony trioxide |

The results of these examples are also recorded in Table I along with two controls which contain (1) a mechanical mixture of magnesium oxide and zinc sulfate (identified as Control F) and (2) a control which contains no magnesium or zinc compounds (identified as Control G).

EXAMPLES 10–14

In these examples a series of runs were made in which the amounts of antimony trioxide and the basic magnesium-zinc sulfate complex were varied. In all of these runs the agents were added to a high impact polystyrene which contained the following ingredients:

| Parts | Ingredients |
| --- | --- |
| 80 | Polystyrene |
| 16 | Cycloaliphatic chlorine and aromatic bromine |
| 1.5 | Ethylene bis-stearamide |

The results of these runs are also recorded in Table II.

EXAMPLES 15–24

In these examples the procedure of Example 10 was used except various amounts of antimony oxide and magnesium-zinc sulfate complex were used. In Examples 15–19, another high impact polystyrene was used which contained 40% of a general purpose polystyrene. In Examples 20–24, polypropylene was employed. The polypropylene employed contained the following ingredients:

| Parts | Ingredients |
| --- | --- |
| 60 | Polypropylene |
| 27 | Cycloaliphatic chlorine |

Again the results are recorded in Table II.

EXAMPLES 25–28

In these examples various amounts of basic magnesium-zinc sulfate and antimony trioxide were added to the following vinyl composition:

| | Parts |
| --- | --- |
| Polyvinyl chloride | 100 |
| Dioctyl phthalate | 35 |
| Dibasic lead phthalate | 7 |
| Ethylene bis-stearamide | 0.4 |
| Dibasic lead stearate | 0.4 |

The vinyl compositions produced were treated for both flame and smoke resistance. The results are recorded in Table II.

EXAMPLE 29

In this example a zinc salt of an organic acid was used to prepare the magnesium-zinc complex salts. The zinc salt employed was normal zinc trimellitate. It was prepared as follows:

76.6 g. of 99% trimellitic anhydride were slurried in 200 ml $H_2O$ at 95° C. A zinc oxide slurry was prepared by adding 48.2 g. zinc oxide to 200 ml $H_2O$.

The trimellitic acid slurry at 75° C. was then added quickly to the zinc oxide slurry, and the mixture was stirred for 2½ hours.

A slurry of magnesium oxide was prepared by adding 90 g. of 88.4% magnesium oxide to 400 ml containing 2.4 ml of 10% acetic acid.

The zinc trimellitate slurry was then added quickly to the magnesium oxide slurry. The temperature of the mixture rose from 25° to 32° C. The mixture was then heated to 85° C. and stirred for 4 hours. After standing for 16 hours the pH was 9.4. The mixture was then filtered, dried and hammer milled as described in Example 1.

The magnesium-zinc complex salt obtained was basic magnesium-zinc trimellitate and it possessed the following analysis:

| | |
| --- | --- |
| % Mg | 19.1 |
| % Zn | 17.0 |
| % Loss (2 hrs. at 105° C.) | 1.2 |
| Moles Mg/Zn | 3.02 |

This complex was also used to treat a polyvinyl chloride having the following composition:

| Ingredients | Parts |
| --- | --- |
| Polyvinyl chloride | 100 |
| Lead stabilizer | 7 |
| Lubricant | 0.2 |
| Dioctyl azelate | 25 |

The procedure used was the same as that described in Example 1. The operational details and the results obtained are recorded in Table III.

EXAMPLES 30–33

In these examples various zinc salts of organic acids were prepared. The procedure of Example 29 was repeated.

In all of these runs the operational details and results obtained are recorded in Table III along with those of Example 29.

Repeating the procedure of Example 29, all of these various magnesium-zinc complex salts were incorporated in the same plastic composition as that used in Example 29 and it was found that in all cases that superior results were obtained.

In all of the examples presented above, the flame and smoke resistance was superior to the controls when the complex magnesium-zinc salt was employed in the plastic composition.

While this invention has been described and illustrated by the examples shown, it is not intended to be strictly limited thereto, and other variations and modifications may be employed within the scope of the following claims.

TABLE I

| Example No. | Plastic Used | Agent Used | Amount of Complex PHR | Moles Mg-Zn | Calculated ZnO PHR | Smoke Density (Dm) | Heat Stability Onset of Black Spots | Heat Stability Complete Blackness | Oxygen Index |
|---|---|---|---|---|---|---|---|---|---|
| Example 1 | Polyvinyl chloride | Complex Basic Mg-Zn sulfate | 3.51 | 3.1 | .75 | 292 | 80 | > 100 | |
| Control A | Polyvinyl chloride | Mixture $ZnSO_4$ MgO | 1.64 1.40 | 3.4 | .75 | 393 | 80 | > 100 | |
| Control B | Polyvinyl chloride | Mixture $ZnSO_4$ $MgSO_4$ | 1.64 3.40 | 3.1 | .75 | 374 | 65 | 90 | |
| Example 2 | Polyvinyl chloride | Complex Basic Mg-Zn fluoborate | 2.97 | 3.2 | .75 | 282 | 40 | 60 | |
| Control C | Polyvinyl chloride | Mixture Zn fluoborate MgO | 2.01 1.40 | 3.3 | .75 | 324 | 20 | 20 | |
| Example 3 | Polyvinyl chloride | Complex Basic Mg-Zn fluosilicate | 3.34 | 4.4 | .75 | 362 | 30 | 70 | |
| Control D | Polyvinyl chloride | Mixture Zn fluosilicate MgO | 3.05 1.40 | 3.2 | .75 | 372 | 30 | 30 | |
| Control E | Polyvinyl chloride | None | — | — | — | 443 | 70 | 90 | |
| Example 4 | Polyvinyl chloride | Complex Basic Mg-Zn sulfate | 3.51 | 3.1 | .75 | 334 | 80 | > 90 | 29.2 |
| Control F | Polyvinyl chloride | Mixture $ZnSO_4$ MgO | 1.64 | 3.4 | .75 | 390 | 40 | 60 | |
| Example 5 | Polyvinyl chloride | Complex Basic Mg-Zn sulfate | 3.08 | 2.5 | .75 | 310 | 50 | 60 | |
| Example 6 | Polyvinyl chloride | Complex Basic Mg-Zn borate | 3.77 | 3.3 | .75 | 303 | 70 | 100 | |
| Example 7 | Polyvinyl chloride | Complex Basic Mg-Zn borate | 3.08 | 2.6 | .75 | 302 | 60 | 80 | 28.5 |
| Control G | Polyvinyl chloride | None | — | — | — | 482 | 70 | > 100 | 29.0 |
| Example 8 | Polyvinyl chloride | Complex Basic Mg-Zn phosphite | 3.53 | 3.3 | .82 | 327 | — | > 100 | |
| Example 9 | Polyvinyl chloride | Complex Basic Mg-Zinc phosphite | 3.46 | 3.3 | 0.82 | 324 | | > 100 | |

TABLE II

| Example No. | Plastic Used | Amount of Basic Mg-Zn Sulfate Used (Moles Mg-Zn=3.8) | Amount of Antimony Trioxide Used | Oxygen Index (OI) | UL-94 | Smoke Density (Dm) |
|---|---|---|---|---|---|---|
| 10 | Polystyrene | 0 | 4 | 24.5 | V-O | |
| 11 | Polystyrene | 1 | 3 | 28.4 | V-O | |
| 12 | Polystyrene | 2 | 2 | 28.9 | V-O | |
| 13 | Polystyrene | 3 | 1 | 25.5 | V-I | |
| 14 | Polystyrene | 4 | 0 | 23.5 | V-II | |
| 15 | Polystyrene | 0 | 4 | 24.3 | V-O | |
| 16 | Polystyrene | 1 | 3 | 24.5 | V-O | |
| 17 | Polystyrene | 2 | 2 | 30.6 | V-O | |
| 18 | Polystyrene | 3 | 1 | 27.2 | V-I | |
| 19 | Polystyrene | 4 | 0 | 22.6 | V-II | |
| 20 | Polypropylene | 0 | 13 | 25.7 | V-I | 354 |
| 21 | Polypropylene | 3 | 10 | 25.9 | V-O | |
| 22 | Polypropylene | 6 | 7 | 27.0 | V-O | 292 |
| 23 | Polypropylene | 9 | 4 | 26.2 | V-I | |
| 24 | Polypropylene | 13 | 0 | 22.6 | Burning | |
| 25 | Polyvinyl chloride | 0 | 0 | 26.9 | | 471 |
| 26 | Polyvinyl chloride | 0 | 3 | 30.7 | | 435 |
| 27 | Polyvinyl chloride | 3 | 3 | 36.0 | | 368 |
| 28 | Polyvinyl chloride | 3 | 0 | 30.1 | | 386 |

TABLE III

| Example No. | Plastic Used | Complex Used | Amount of Complex PHR | Amount of Moles Mg-Zn | Calculated ZnO PHR | Smoke Density (Dm) | Heat Stability Onset of Black Spots | Heat Stability Complete Blackness | Oxygen Index (OI) |
|---|---|---|---|---|---|---|---|---|---|
| 29 | Polyvinyl chloride | Basic Mg-Zn trimellitate | 4.38 | 3.34 | 0.82 | 307 | | 100 | 39.2 |
| 30 | Polyvinyl chloride | Basic Mg-Zn pyromellitate | 4 | 4.7 | 0.82 | 318 | | 100 | 38.2 |
| 31 | Polyvinyl chloride | Basic Mg-Zn terephthalate | 7.96 | 9.1 | 0.82 | 265 | | 100 | 39.2 |
| 32 | Polyvinyl chloride | Basic Mg-Zn fumarate | 3.54 | 2.67 | 0.82 | 361 | 80 | 100 | |
| 33 | Polyvinyl chloride | Basic Mg-Zn maleate | 3.38 | 2.67 | 0.82 | 343 | | 100 | |

We claim:

1. A composition of matter comprising a magnesium-zinc reaction product, said composition prepared by slurrying from 2 to 10 moles of magnesium oxide in an aqueous solution containing 1 mole of a zinc salt of an acid, filtering the precipitate and heating the precipitate to dryness at a temperature of about 100° C.

2. Composition according to claim 1 in which the acid in the zinc salt is an inorganic acid.

3. Composition according to claim 1 in which the acid in the zinc salt is an organic acid.

4. Composition according to claim 1 in which an inorganic zinc salt is employed and is selected from the group consisting of zinc sulfate, zinc borate, zinc phosphate, zinc phosphite, zinc fluoborate, zinc orthophosphate, zinc sulfite, zinc fluosilicate, zinc silicate and zinc sulfamate and mixtures thereof.

5. Composition according to claim 1 in which an organic zinc salt is imployed and is selected from the group consisting of zinc trimellitate, zinc pyromellitate, zinc terephthalate, zinc fumarate, zinc phthalate, zinc maleate, zinc salicylate, zinc gluconate, zinc tartrate, zinc isophthalate, zinc orthophthalate, zinc adipates, zinc glutamates and zinc lactate and mixtures thereof.

6. Method for preparation of a magnesium-zinc reaction product which comprises slurrying from 2 to 10 moles of magnesium oxide in an aqueous solution containing 1 mole of a zinc salt of an acid, filtering the precipitate and heating the precipitate to dryness at a temperature of about 100° C.

7. Method for retarding smoke and fire in a halogen-containing polymer composition which comprises adding a magnesium-zinc reaction product to the components of said polymer composition during formulation thereof, said reaction product added in amounts in the range of from about 0.2 to about 20 parts per hundred parts by weight of said polymer, said reaction product prepared by slurrying from 2 to 10 moles of magnesium oxide in an aqueous solution containing 1 mole of a zinc salt of an acid, filtering the precipitate and heating the precipitate to dryness at a temperature of about 100° C.

8. Method according to claim 7 wherein the polymer composition is polyvinyl chloride.

9. Method according to claim 7 wherein the polymer composition is polystyrene.

10. Method according to claim 7 in which the polymer is polypropylene.

11. Method according to claim 7 in which an antimony compound is also added as a component in said polymer composition.

12. A normally combustible article of manufacture characterized by minimal smoking and burning, said article of manufacture comprising a halogen-containing polymer composition, said polymer composition having a smoke and fire retardant incorporated therein comprising a magnesium-zinc reaction product in an amount in the range of from about 0.2 to about 20 parts per hundred parts polymer resin, said reaction product containing from 2 to 10 moles of magnesium for each mole of zinc, said reaction product prepared by slurrying from 2 to 10 moles of magnesium oxide in an aqueous solution containing 1 mole of a zinc salt of an acid, filtering the precipitate and heating the precipitate to dryness at a temperature of about 100° C.

13. Composition according to claim 12 in which the acid in the complex salt is an inorganic acid.

14. Composition according to claim 12 in which the acid in the complex salt is an organic acid.

15. Composition according to claim 12 in which said polymer composition also contains an antimony compound.

* * * * *